United States Patent
Chung et al.

[11] Patent Number: 6,044,475
[45] Date of Patent: Mar. 28, 2000

[54] CHECKPOINT AND RESTORATION SYSTEMS FOR EXECUTION CONTROL

[75] Inventors: Pi-Yu Chung, Berkeley Heights; Yennun Huang, Bridgewater; Chandra Kintala, Warren; Kiem-Phong Vo; Yi-Min Wang, both of Berkeley Heights, all of N.J.

[73] Assignee: Lucent Technologies, Inc., Murray Hill, N.J.

[21] Appl. No.: 08/981,297

[22] PCT Filed: Jun. 16, 1995

[86] PCT No.: PCT/US95/07660

§ 371 Date: Mar. 3, 1998

§ 102(e) Date: Mar. 3, 1998

[87] PCT Pub. No.: WO97/00477

PCT Pub. Date: Jan. 3, 1997

[51] Int. Cl.[7] .................................................. G06F 11/14
[52] U.S. Cl. ............................................................. 714/15
[58] Field of Search .................................. 714/15, 16, 17, 714/19; 712/228

[56] References Cited

U.S. PATENT DOCUMENTS

| | | |
|---|---|---|
| 4,697,266 | 9/1987 | Finley . |
| 4,814,971 | 3/1989 | Thatte . |
| 4,819,156 | 4/1989 | DeLorme et al. . |
| 4,868,744 | 9/1989 | Reinsch et al. . |
| 5,201,044 | 4/1993 | Frey, Jr. et al. . |
| 5,235,700 | 8/1993 | Alaiwan et al. . |
| 5,333,303 | 7/1994 | Mohan . |
| 5,369,757 | 11/1994 | Spiro et al. ......................... 395/575 |
| 5,440,726 | 8/1995 | Fuchs et al. . |
| 5,530,802 | 6/1996 | Fuchs et al. ..................... 395/182.15 |
| 5,590,277 | 12/1996 | Fuchs et al. ..................... 395/183.14 |

OTHER PUBLICATIONS

Saleh, Kassem et al. "Efficient and Fault–Tolerant Check-pointing Procedures for Distributed Systems," *Computers and Communications*, 1993 International Phoenix Conference.

Primary Examiner—Robert W. Beausoliel, Jr.
Assistant Examiner—Scott T. Baderman

[57] ABSTRACT

A checkpoint and restoration system is disclosed to provide checkpoint and restoration techniques for user application processes which save the process state, including the volatile state and desired portions of the persistent state, during normal execution, and thereafter restore the saved state. A lazy checkpoint technique is disclosed which delays the taking of the persistent state checkpoint until an inconsistency between the checkpointed volatile state and a portion of the persistent state is about to occur. The disclosed checkpoint and restoration system allows a user or a user application process to specify selected portions of the persistent state to be excluded from a checkpoint. A selected portion of the pre-restoring process state, such as a return value argument, may be protected before restoring the user application process to a checkpointed state, so that the pre-restoration values of the protected state are retained following restoration of the checkpoint. The retained return value allows one or more segments of restoration code to be executed following a restoration and a normal execution mode to be distinguished from a restoration mode.

20 Claims, 10 Drawing Sheets

FIG. 2
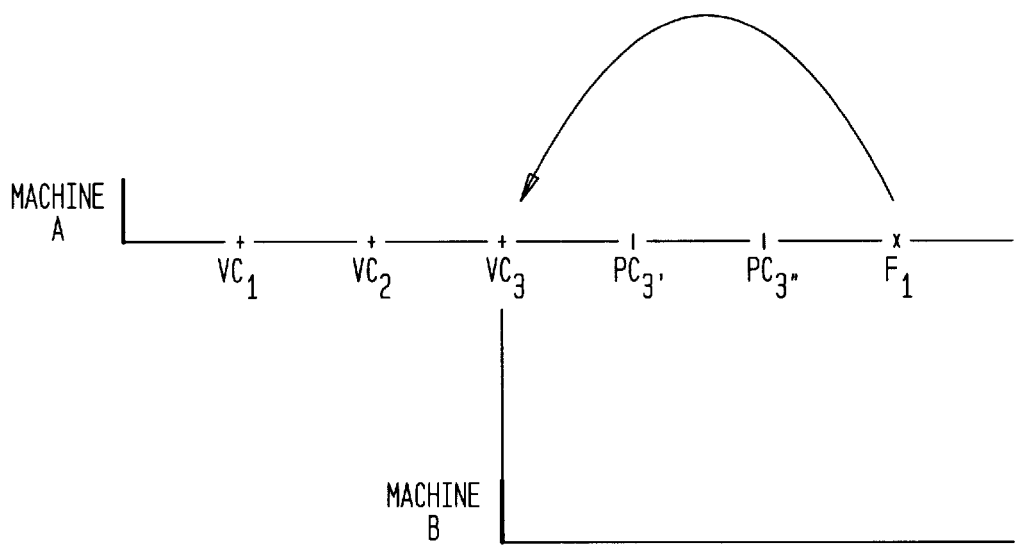
FIG. 3
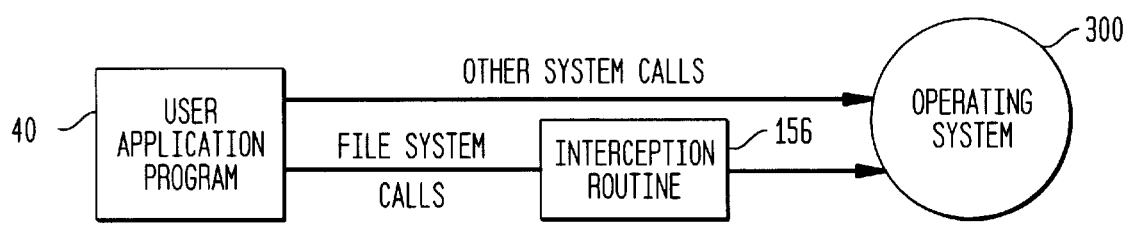
FIG. 4
| PERSISTANT CHECKPOINT TABLE CHECKPOINT ID = 2 |||||
|---|---|---|---|---|
| FILE NAME | MODIFICATION TIME | MODE | ... | SIZE |
| A | 01:24 | -1 | | 10 |
| ... | | | | |
| X | 06:35 | -1 | | 15 |

```
line 1005   retry count=0;
LINE 1010   while ((prt = malloc(size)) == NULL {
LINE 1015       retry_count = retry_count + 1;
LINE 1020       if (retry_count == MAX_RETRY_COUNT) {
LINE 1025           if (chkpnt() <= 0)
LINE 1030               print malloc error message;
LINE 1035               exit;
LINE 1040           } else retry_count = 0;/* insert recovery code */
LINE 1045       }
LINE 1050       sleep(RETRY_WAIT_PERIOD);
LINE 1055   }
LINE 1060   use ptr;
```

CHECKPOINT AND RESTORATION SYSTEMS FOR EXECUTION CONTROL

CROSS REFERENCE TO RELATED APPLICATION

The present invention is related to the following International Patent Application: "Persistent State Checkpoint and Restoration Systems," International Application No. PCT/US95/07629 filed contemporaneously herewith (Attorney Docket No. Chung 1-8-5-7-4), assigned to the assignee of the present invention and incorporated herein by reference.

TECHNICAL FIELD

The present invention relates to a system for checkpointing and restoring the state of a process, and more particularly, to systems for checkpointing and restoring the process state, including lazy checkpoints of the persistent process state, or any specified portion thereof.

BACKGROUND ART

Increasingly, the users of software applications are demanding that the software be resistant, or at least tolerant, to software faults. Users of telecommunication switching systems, for example, demand that the switching systems are continuously available. In addition, where transmissions involve financial transactions, such as for bank automated teller machines, or other sensitive data, customers also demand the highest degree of data consistency.

Thus, a number of software testing and debugging tools have been developed for detecting many programming errors which may cause a fault in a user application process. For example, the Purify™ software testing tool, commercially available from Pure Software, Inc., of Sunnyvale, Calif., and described in U.S. Pat. No. 5,193,180, provides a system for detecting memory access errors and memory leaks. The Purify™ system monitors the allocation and initialization status for each byte of memory. In addition, for each software instruction that accesses memory, the Purify™ system performs a test to ensure that the program is not writing to unallocated memory, and is not reading from uninitialized or unallocated memory.

While software testing and debugging tools, such as the Purify™ system, provide an effective basis for detecting many programming errors which may lead to a fault in the user application process, no amount of verification, validation or testing during the software debugging process will detect and eliminate all software faults and give complete confidence in a user application program. Accordingly, residual faults due to untested boundary conditions, unanticipated exceptions and unexpected execution environments have been observed to escape the testing and debugging process and, when triggered during program execution, will manifest themselves and cause the application process to crash or hang, thereby causing service interruption.

It is therefore desirable to provide mechanisms that allow a user application process to recover from a fault with a minimal amount of lost information. Thus, in order to minimize the amount of lost information, a number of checkpointing and restoration techniques have been proposed to recover more efficiently from hardware and software failures. For a general discussion of checkpointing and rollback recovery techniques, see R. Koo and S. Toueg, "Checkpointing and Rollback-Recovery for Distributed Systems," IEEE Trans. Software Eng., Vol. SE-13, No. 1, pp. 23–31 (January 1987). Generally, checkpoint and restoration techniques periodically save the process state during normal execution, and thereafter restore the saved state following a failure. In this manner, the amount of lost work is minimized to progress made by the user application process since the restored checkpoint.

It is noted that the state of a process includes the volatile state as well as the persistent state. The volatile state includes any process information that would normally be lost upon a failure. The persistent state includes all user files that are related to the current execution of the user application process. Although the persistent state is generally not lost upon a failure, it is necessary to restore the persistent state to the same point as the restored volatile state, in order to maintain data consistency.

While existing checkpointing and recovery techniques have adequately addressed checkpointing of the volatile state, these techniques have failed to adequately address checkpointing of the persistent state. According to one approach, all of the persistent state, in other words, all of the user files, are checkpointed with each checkpoint of the volatile state. Clearly, the overhead associated with this technique is prohibitively expensive for most applications. Other techniques, such as existing Unix™ checkpoint libraries, checkpoint only the file descriptors of those user files which are active or open at the time a checkpoint of the volatile state is taken. However, consistency problems are encountered with such techniques if a user file is created or activated after the checkpoint is taken, because modifications to the newly created or activated file since the latest checkpoint will not be undone if the process is restored to its latest checkpoint. Such an inconsistent state can often lead to corrupted files which may not be detected.

Although such checkpointing and restoration techniques perform effectively in many application environments, they suffer from a number of limitations which, if overcome, could expand the consistency and transparency of checkpointing systems and extend their utility to other applications which heretofore have not been considered. In particular, few, if any, prior checkpointing and restoration techniques have exploited the advantages of checkpointing and recovery outside of a failure recovery context.

As is apparent from the above discussion, a need exists for a checkpointing and restoration technique which allows the entire persistent state, or a desired portion thereof, to be included in each checkpoint. A further need exists for a lazy checkpointing and restoration technique which delays the checkpointing of the persistent state until an inconsistency is about to occur. A further need exists for a checkpointing and restoration system which also allows selected portions of the persistent state to be excluded from a given checkpoint, so that the saved intermediate state can be used as a starting point for executing new tasks. Yet another need exists for a checkpointing and restoration system which allows a selected portion of the current process state to be protected, before restoration, so that the pre-restoration values of the protected state are maintained following restoration of a checkpoint.

SUMMARY OF THE INVENTION

Generally, according to one aspect of the invention, a checkpoint and restoration system is provided to implement checkpoint and restoration techniques in a user application process to save the process state during normal execution, and thereafter restore the saved state, for example, during a recovery mode following a failure. According to a feature of the present invention, the checkpoint and restoration system performs checkpoints of both the volatile and persistent states. According to a further feature of the invention, the checkpoint and restoration system allows a user or a user application process to specify selected portions of the persistent state to be excluded from a checkpoint. In this manner, a desired intermediate state can be checkpointed and used as a starting point for executing new processing tasks.

In another embodiment, the present checkpoint and restoration system can be utilized to exclude the entire persistent state, in other words, the user files associated with the process, from the portion of the process state that is checkpointed. Thus, only a "clean" memory state is included in the checkpointed data, which may be restored from time to time to avoid a gradual build up of an undesirable memory state.

According to yet another feature of the invention, the checkpoint and restoration system allows a selected portion of the current process state to be protected, before restoring the user application process to a checkpointed state, so that the pre-restoration values of the protected state are retained following restoration of the checkpoint. In one implementation, a user or user application process can specify a return value to be returned following the restoration. The return value can be utilized to identify one or more segments of restoration code to be executed following a restoration. It is noted that following restoration, execution will proceed from the point where the restored checkpoint was taken. Thus, the return value also allows a normal execution mode to be distinguished from a restoration mode.

A further feature of the invention provides a method for controlling the execution of a user application process following the restoration of a checkpointed state, where the user application process has an associated process state. The method comprises the steps of: checkpointing at least a portion of the process state at a first execution point; restoring the process state to the checkpointed state at a second execution point, the restored process state retaining a pre-restoration value of at least one variable; resuming execution of the user application process using the restored process state; and performing one or more instructions in the user application process based on the retained pre-restoration value.

Yet another feature of the invention provides a method for use by a user application process for bypassing an exception condition which causes a premature software exit. The method comprises the steps of: monitoring the application process for the exception condition; initiating a checkpoint of the user application process upon detection of the exception condition and before prematurely exiting the process, the checkpoint being taken at a checkpoint position; exiting the process; restoring the process to the checkpoint position with a return value argument after a delay period, the return value indicating a recovery mode; and examining the return value following the restoration and attempting to bypass the exception condition if the return value indicates a recovery mode.

A further feature of the invention provides a method for tolerating one or more flaws in a software component imported into a user application process. The user application process has a process state which includes one or more associated user files, and performs at least two iterations of a processing task, identified by a counter value. The method comprises the steps of: initializing the user application process to form an initialized state; specifying that the user files should be excluded from a checkpoint of the process state; checkpointing the portions of the process state which have not been excluded; executing the processing task based on the initialized state and the counter value; incrementing the counter value; restoring the checkpointed portions of the process state for one or more predefined value of the counter value, the restored process state retaining the current value of the counter value; and repeating the executing step.

A more complete understanding of the present invention, as well as further features and advantages of the invention, will be obtained by reference to the detailed description and drawings.

BRIEF DESCRIPTION OF THE DRAWINGS

FIG. 2 illustrates an execution graph for a user application process and demonstrates volatile checkpoints, persistent checkpoints and process migration to an alternate machine;

FIG. 3 illustrates an interception routine which monitors file system calls between a user application process and the operating system to detect changes to the persistent state which will create an inconsistency between the persistent and volatile states;

FIG. 4 illustrates a persistent checkpoint table that maintains persistent state checkpoint information for each file modified since the latest volatile checkpoint;

DETAILED DESCRIPTION

Figure 1:
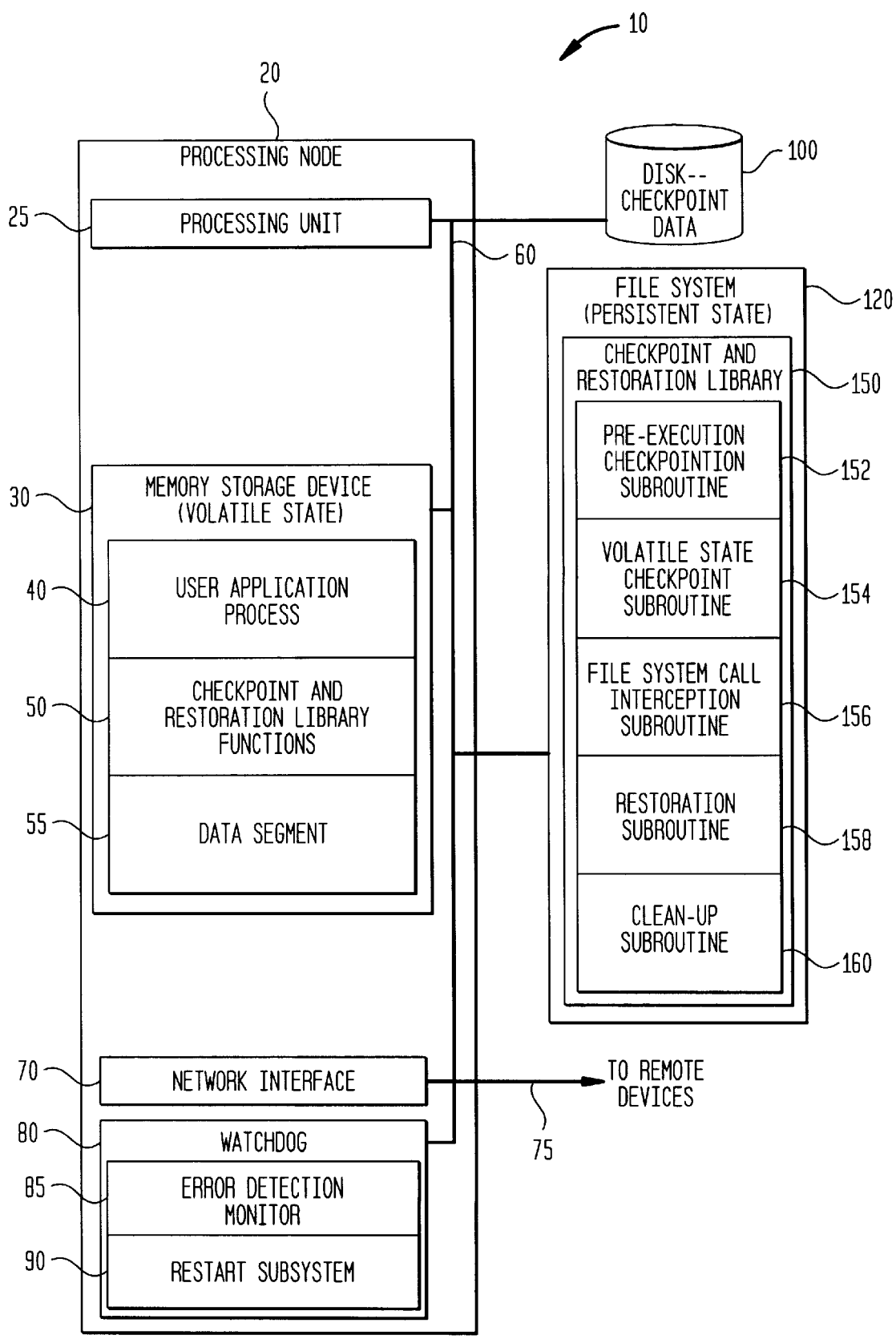
FIG. 1 is a schematic block diagram illustrating a checkpointing and restoration system according to the present invention.

A checkpoint and restoration system 10 according to the present invention is shown in FIG. 1. As discussed further below, the checkpoint and restoration system 10 allows checkpoint and restoration techniques to be implemented in user application processes in order to save the process state during normal execution, and thereafter restore the saved state, for example, during a recovery mode following a failure. In this manner, the amount of work that is lost by the application process is limited to what has been produced since the latest checkpoint.

SYSTEM ARCHITECTURE

As shown in FIG. 1, the checkpoint and restoration system 10 disclosed herein may be implemented on a processing node 20, such as a minicomputer, workstation or other general-purpose computing device, having at least one processing unit 25 and a memory storage device 30. The processing unit 25 and memory storage device 30 of the processing node 20 may be interconnected by a bus 60, or inter-process communication (IPC) facilities on the local processing node 20 for intra-node communication, in a known manner. In addition, each node 20 may be interconnected with other nodes or a remote centralized recovery coordinator (not shown) by means of a network interface 70, such as an ATM host adapter card commercially available from Fore Systems, Inc. of Pittsburgh, Pa., to a communication link 75, in a known manner, for serial or parallel inter-node communication. In this manner, if a user application process cannot be successfully recovered on the local node 20, for example, due to a permanent or long-term hardware failure, the user application process may be exported to a remote processing node. This technique is often referred to as process migration.

The processing unit 25 may be embodied as a single processor, or a number of processors operating in parallel. The memory storage device 30, which is typically an area of unstable volatile memory, is operable to store one or more instructions which the processing unit 25 is operable to retrieve, interpret and execute. In one embodiment, the volatile memory storage device 30 will store the software code associated with each user application process, such as the process 40, being executed by the processing unit 25, as well as one or more checkpoint library functions 50 which are invoked by the user process 40. In addition, the volatile memory storage device 30 will include a data segment section 55 for storing the data associated with the respective user application process 40 and the checkpoint and restoration library functions 50, in a known manner.

The checkpoint library functions 50 which are invoked by the user application process 40 are selected from a checkpoint and restoration library 150, which may be stored locally or on a centralized file system, such as the file system 120. A file system, such as the file system 120, provides a centralized repository for storing files which may be accessed by one or more users. Typically, a centralized file system 120 is an area of non-volatile or persistent memory, which can retain information even in the absence of power.

As discussed further below, the functions contained in the checkpoint and restoration library 150 are user-level library functions preferably written in a high level programming language, such as the C programming language. The functions in the checkpoint and restoration library 150 can be invoked by a user application process to save the process state during normal execution, or to restore the saved state, for example, during a recovery mode following a failure. In one embodiment, the user process 40 which invokes a function from the checkpoint and restoration function 150 will be bound together with the code of the invoked function during compilation or by a dynamic linking process.

As shown in FIG. 1, the checkpoint and restoration library 150 includes a pre-execution checkpoint subroutine 152, discussed further below in conjunction with FIG. 5, which is invoked before execution of a user application process. In addition, the checkpoint and restoration library 150 includes a volatile state checkpoint subroutine 154, discussed further below in conjunction with FIG. 6, which, when invoked by a user application process 40, will store a copy of the volatile state, from the volatile memory 30 in an area of nonvolatile memory, such as on a disk 100. The checkpoint disk 100 may reside locally on the processing node 20, or on a remote node of a communication network. In addition, the checkpoint and restoration library 150 preferably includes a file system call interception subroutine 156, discussed below in conjunction with FIGS. 3 and 7, which provides a lazy technique for checkpointing desired portions of the persistent state.

Figure 8A:
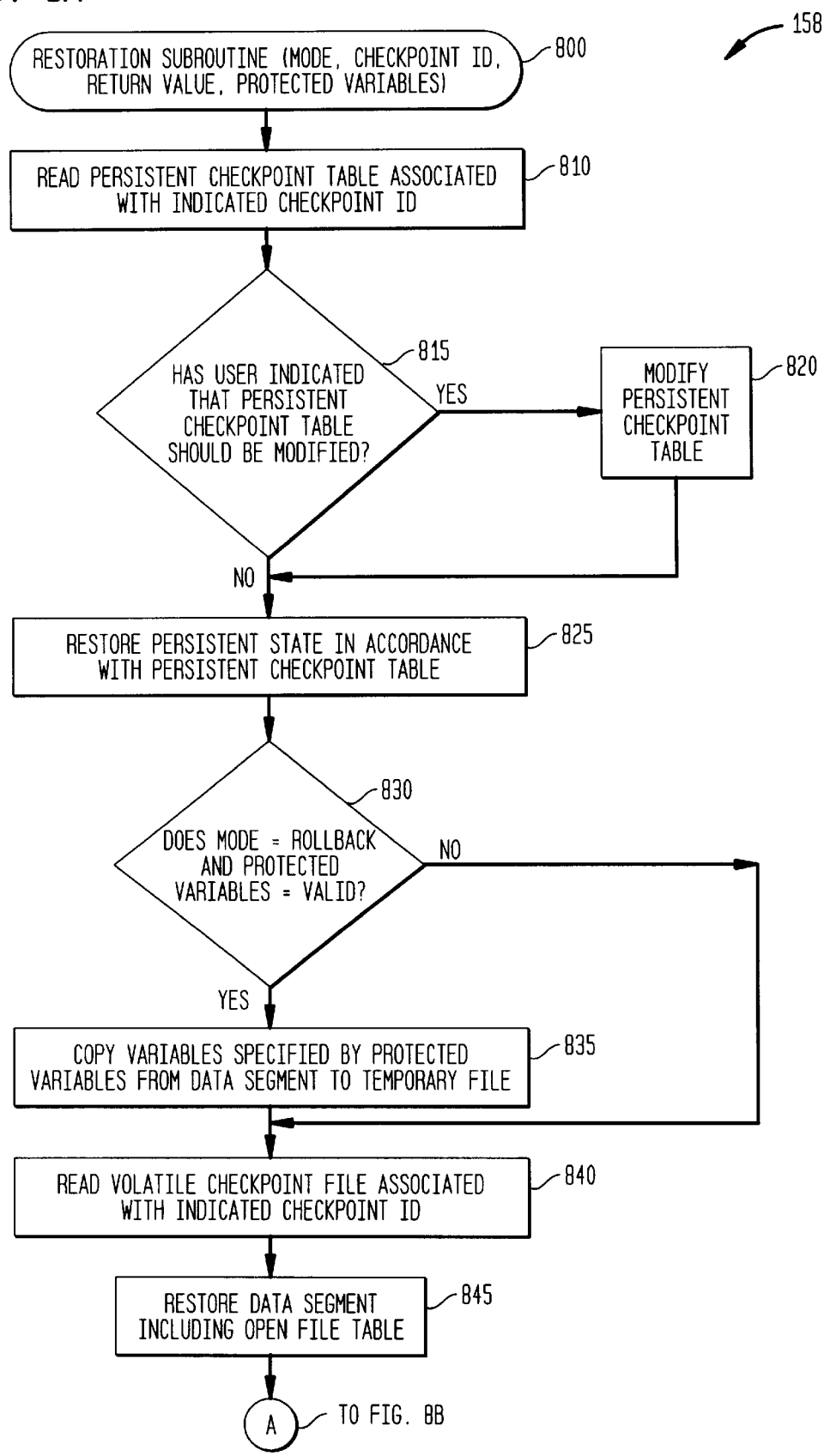
FIGS. 8A and 8B, collectively, are a flowchart describing an exemplary restoration subroutine which is utilized to restore the process state to an identified checkpoint with a return value that may control post-restoration processing.
Figure 8B:
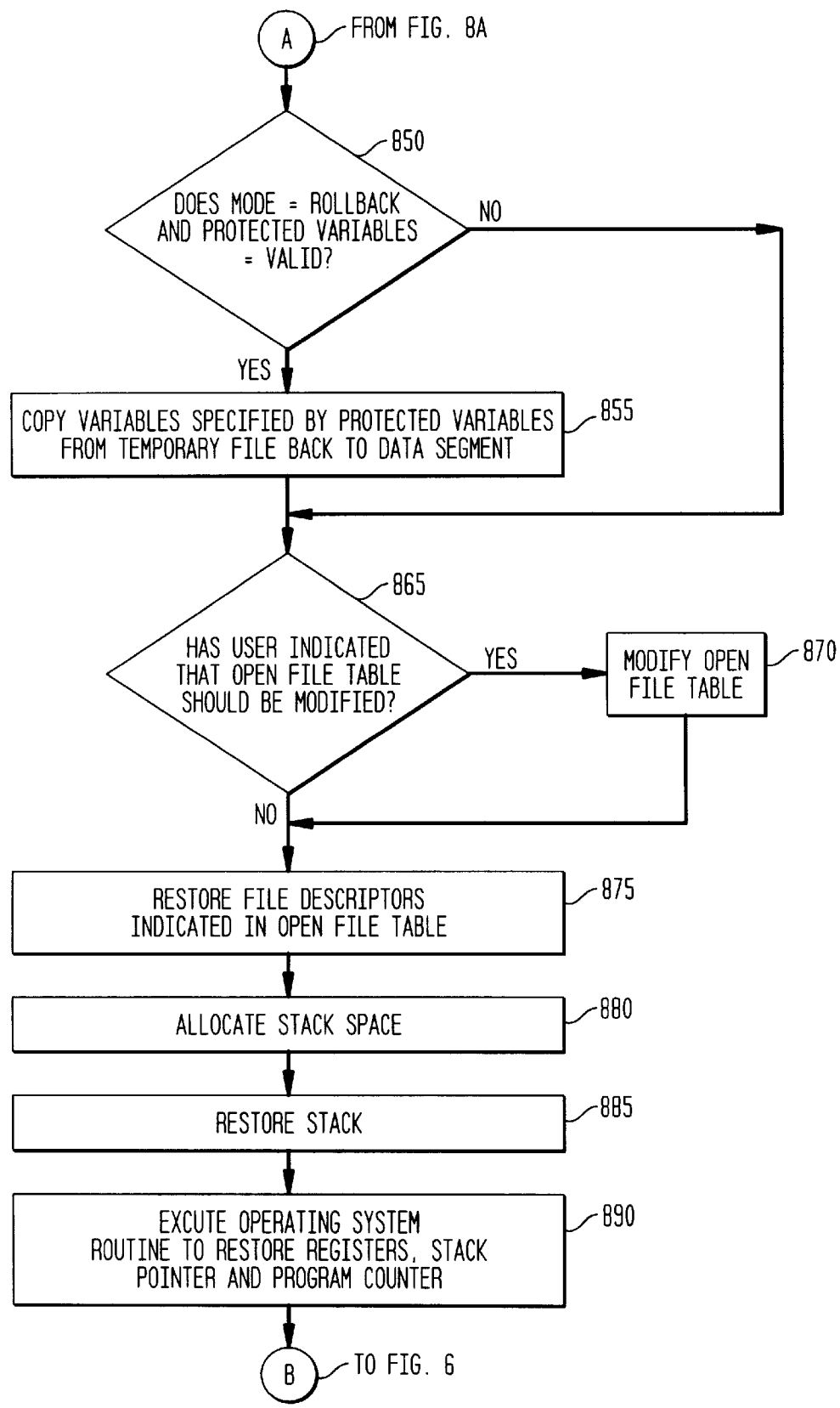

The library 150 also includes a restoration subroutine 158 which is invoked to restore a user application process to a desired checkpoint, as discussed in conjunction with FIGS. 8A and 8B. As previously indicated, the restoration subroutine 158 provides a mechanism for allowing a user to specify one or more user files to be excluded from the persistent state checkpoint, which allows a user application process to process future inputs from a desired or predictable state. Finally, the checkpoint and restoration library 150 includes a clean-up subroutine 160 which is invoked following execution of a user application process to delete the created checkpoint files, if necessary.

In various implementations, the restoration subroutine 158 may be initiated automatically upon a detected fault or manually by a user, for example, by a command line entry, as would be apparent to a person of ordinary skill. In an automatic implementation shown in FIG. 1, each node, such as the node 20, may have a watchdog 80 which includes an error detection monitor 85 for monitoring processes that are executing on the respective node. The error detection monitor 85 will continuously monitor one or more application processes executing on the node 20, such as process 40, to determine whether the process is hung or has crashed.

The monitoring performed by the error detection monitor 85 may be either active or passive. In an active monitoring arrangement, the watchdog 80 may poll each monitored application process to determine its condition by periodically sending a message to the process using the Inter Process Communication (IPC) facilities on the local node 20 and evaluating the return value to determine whether that process is still active.

In a passive monitoring arrangement, each application process includes a function from the library 150, which, when invoked by a user application process, such as the process 40, will send a heartbeat message at specified intervals to the watchdog 80, indicating that the associated process 40 is still active. If the watchdog 80 does not receive another signal from the application process 40 before the end of the specified interval, the watchdog 80 will presume that the application process is hung or has crashed.

As discussed further below, upon detection of a fault in a user application process 40 by the error detection monitor 85, a restart subsystem 90 will attempt to recover the faulty application process by initiating a restart of the faulty application process, at its latest checkpoint, in the manner described below. Preferably, the restart subsystem 90 will invoke the restoration subroutine 158, upon a detected failure, to initiate the restarting of the faulty user application process.

CHECKPOINT AND RECOVERY CONCEPTS AND DEFINITIONS

For a general discussion of checkpoint and recovery concepts and definitions, see, for example, Yi-Min Wang et al., "Progressive Retry Technique for Software Error Recovery in Distributed Systems", Proc. of 23d IEEE Conf. on Fault-Tolerant Computing Systems (FTCS), pp. 138–144 (June, 1993); or R. Koo and S. Toueg, "Checkpointing and Rollback-Recovery for Distributed Systems," IEEE Trans. Software Eng., Vol. SE-13, No. 1, pp. 23–31 (January 1987), each incorporated herein by reference. Generally, checkpoint and restoration techniques save the process state from time to time during normal program execution, and thereafter restore the saved state, for example, following a failure, in order to minimize the amount of lost work.

FIG. 2 represents the execution of a user application process, such as the process 40. As the user application process 40 continues execution, checkpoints of the volatile state are invoked, such as the volatile checkpoints $VC_1$, $VC_2$ and $VC_3$. As used herein, the term volatile state includes any information that would normally be lost upon a failure, such as the program stack, open file descriptors, static and dynamic data segments, as well as data structures associated with the operating system kernel that are essential to current program execution, such as operating system registers, the program counter and the stack pointer.

In addition, according to features of the present invention, if a user application process 40 attempts to perform a file operation that will modify the persistent state, such as one or more attributes of a user file, the affected files will be checkpointed in a manner described below, before the desired file operation is executed, as indicated by the persistent checkpoints $PC_{3'}$ and $PC_{3''}$. As used herein, the term persistent state includes all user files that are related to the current execution of the user application process. Although the persistent state is generally not lost upon a failure, the persistent checkpoints ensure that when a process rolls back to its latest volatile checkpoint, for example, upon a detected failure, the persistent state will be consistent with the volatile state. It is again noted that the persistent state is preferably not recorded until an update to a given file will make the file inconsistent with the volatile state associated with the latest checkpoint. As discussed below, the persistent checkpoints, $PC_{3'}$ and $PC_{3''}$, allow all of the modifications to the persistent state since the latest volatile checkpoint to be undone.

In this manner, upon detection of a failure, at the point marked "$F_1$", the volatile state of the process can be rolled back to the latest volatile checkpoint, $VC_3$, by restoring the checkpoint data associated with the checkpoint, $VC_3$. In addition, the persistent checkpoints, $PC_{3'}$ and $PC_{3''}$, allow each of the modifications to the persistent state since the latest volatile checkpoint, $VC_3$, to be undone. Thus, following the roll back, the overall persistent state will be consistent with the volatile state as it existed at the time of latest volatile checkpoint, $VC_3$. It is again noted that if the process cannot be successfully restarted on machine A, process migration allows the process to be restarted on an alternate machine, such as machine B, as shown in FIG. 2.

MONITORING PERSISTENT STATE BY INTERCEPTING FILE SYSTEM CALLS

As indicated above, the persistent state includes all user files that are related to the current execution of the user application process. In general, the only way in which a user application process can access, and thus potentially alter, a user file is by means of a file system call sent to the operating system kernel. Thus, if each file system call generated by a user application process is intercepted and evaluated by the checkpoint and restoration system 10, all of the potential changes to the persistent state may be identified. Thus, as conceptually represented by FIG. 3, all file system calls generated by a user application process, such as the process 40, are preferably intercepted and monitored by one or more interception routines 156, discussed below in conjunction with FIG. 7, before the desired file operation is actually performed by the operating system 300. In this manner, if a particular file operation is about to alter one or more files associated with the persistent state, the status of the affected files can be recorded to ensure consistency.

In one embodiment, the persistent state checkpoints are recorded in a persistent checkpoint table 400, shown in FIG. 4. The persistent checkpoint table 400 is preferably stored in a persistent memory, such as a disk, and is stored to the disk each time the table 400 is modified. Each persistent checkpoint table 400 is preferably associated with a particular user application process, as well as a particular volatile checkpoint, identified by its checkpoint id, and includes a plurality of rows, such as the rows 405 and 410, each associated with a user file which has been modified in some manner since the associated volatile checkpoint. For each file indicated by its file name in column 430, the persistent checkpoint table 400 preferably includes an entry for each file attribute that may be modified. For example, the persistent checkpoint table 400 preferably contains a column 435 for recording the modification time of each file, a column 440 for recording the access mode of each file, and a column 445 for recording the current size of each file.

In one implementation, each entry in the table 400 is preferably initialized with a default value, such as "$-1$", when a row is created for a given file. Thereafter, if one or more attributes of the associated file are modified, the then current attribute value can be recorded before being modified. In this manner, if a given attribute of a file being restored contains a value of "$-1$", the particular attribute has not been modified and need not be restored. As discussed below in conjunction with FIG. 7, entries are preferably created in the persistent checkpoint table 400 by the file system call interception subroutine 156. In addition, as discussed below in conjunction with FIGS. 8A and 8B, during restoration of a particular checkpoint, identified by a checkpoint id value, the restoration subroutine 158 will access the persistent checkpoint table 400 and utilize the information contained therein to restore the persistent state.

CHECKPOINT AND RESTORATION LIBRARY FUNCTIONS

Pre-Execution Checkpoint Subroutine

As previously indicated, the checkpoint and restoration library 150, preferably includes a pre-execution checkpoint subroutine 152. The pre-execution checkpoint subroutine 152 is preferably executed before execution of the user application process 40. For example, programs written in the C programming language normally begin execution on the first line with a "main" routine. Accordingly, execution of the pre-execution checkpoint subroutine 152 should be invoked before execution of the "main" routine.

The checkpoint and restoration system 10 preferably provides two modes of operation for performing checkpoints, namely, an inserted mode and a transparent mode. The inserted mode allows a user application process to implement a checkpoint mechanism by inserting checkpoint function calls at desired places in the source code. The transparent mode provides a mechanism for automatically performing checkpoints at specified time intervals. The transparent mode allows a user application process to incorporate checkpointing mechanisms without requiring any changes to the source code of the user application process or any recompilation.

As discussed below, when in a transparent mode, a clock daemon process is preferably created by the pre-execution checkpoint subroutine 152 in order to initiate checkpoints at the predefined intervals. As discussed below, upon each specified interval, the created clock daemon process will cause a system interrupt call to be transmitted by the operating system to the associated user application process in order to initiate the checkpoint.

Figure 5:
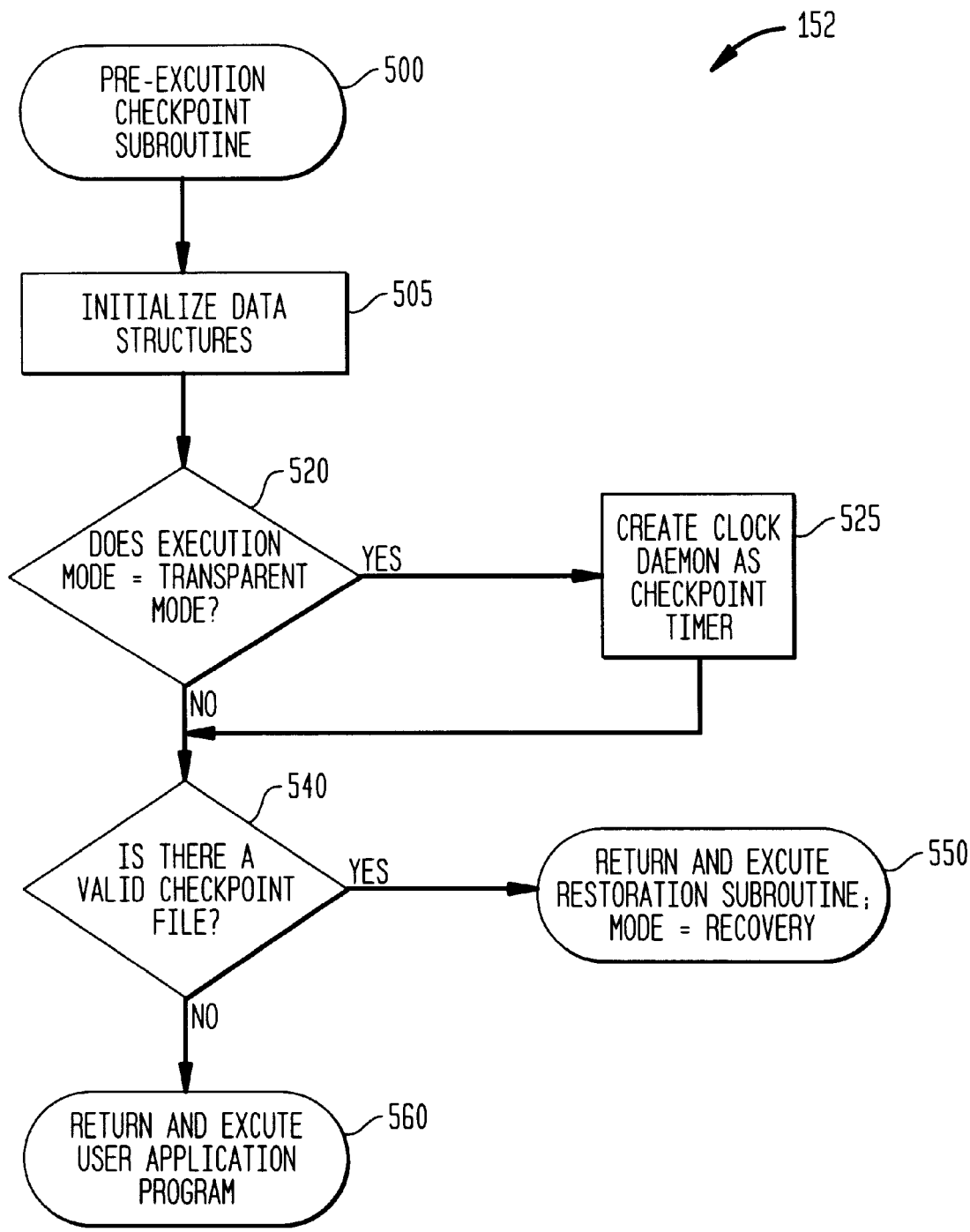
FIG. 5 is a flowchart describing an exemplary pre-execution checkpoint subroutine which is invoked before execution of a user application process.

Thus, as shown in FIG. 5, the pre-execution checkpoint subroutine 152 will be entered at step 500 and will thereafter initialize any data structures required by the checkpoint and restoration system 10 during step 505, such as the open file table and the persistent checkpoint table 400.

Thereafter, a test is performed during step 520 to determine if the user application process is executing in an inserted mode or a transparent mode, for example, as specified by the user on the command line, or by the setting of one or more environmental variables. If it is determined during step 520 that the user application process is executing in a transparent mode, then the clock daemon process is created during step 525, for example, by a fork system call. As indicated above, the clock daemon process will serve as the checkpoint timer to initiate checkpoints of the user application process at the specified interval. In one embodiment, the checkpoint will be initiated at a default interval, such as every thirty (30) minutes, if another interval is not specified.

If, however, it is determined during step 520 that the user application process is executing in an inserted mode, then checkpoints will only be initiated when they are invoked by execution of the user application process.

A test is performed during step 540 to determine if a valid checkpoint file already exists for the associated user application process. In other words, the test determines whether the current execution is a normal execution mode or a recovery mode. It is noted that when a user application process terminates normally, a clean-up subroutine 160, discussed below in conjunction with FIG. 9, will delete the checkpoint files associated with the user application process, unless specified otherwise. Thus, if a checkpoint file exists for a user application process upon initiation, either the previous execution did not terminate normally, for example, due to a failure, or the user application process has requested that the checkpoint file should be stored for subsequent restoration. If it is determined during step 540 that a valid checkpoint file does exist for the associated user application process, then the pre-execution checkpoint subroutine 152 will preferably return and execution of the restoration subroutine 158, discussed below in conjunction with FIGS. 8A and 8B, will preferably commence during step 550, in order to restore the data associated with the existing checkpoint file and commence execution of the user application process at the point of the restored checkpoint.

If, however, it is determined during step 540 that a valid checkpoint file does not exist for the associated user application process, then the pre-execution checkpoint subroutine 152 will preferably return and execution of the user application process is preferably initiated during step 560.

Volatile State Checkpoint Subroutine

As previously indicated, the checkpoint and restoration library 150, preferably also includes a volatile state checkpoint subroutine 154, which is invoked in the transparent mode by an interrupt signal from the clock daemon, indicating that a checkpoint should be initiated, or in the inserted mode when a checkpoint function call inserted in the source code of the user application process is being executed. In addition, as discussed below, the volatile state checkpoint subroutine 154 is indirectly invoked at step 620 from the restoration subroutine 158 after the value of the program counter is restored.

The volatile state checkpoint subroutine 154 will save all of the information that would otherwise be lost upon a failure that is needed to restore the user application process. In one embodiment, the volatile state checkpoint subroutine 154 is passed a checkpoint id argument that may be utilized to identify each checkpoint interval. If the volatile state checkpoint subroutine 154 is not passed a checkpoint id argument, the previous checkpoint data is preferably overwritten. Since the checkpoint id argument is preferably a global variable, it can be subsequently accessed by the file system call interception subroutine 156, which implements checkpoints of the persistent state, in order to associate the persistent state checkpoints with the appropriate (current) volatile checkpoint.

As previously indicated, some of the volatile information related to current execution of a user application process, such as hardware registers for temporary storage of values in the central processing unit, the stack pointer and the program counter, are maintained by the operating system kernel. Although these memory elements are not normally accessible by user application processes, the operating system will typically provide one or more routines which allows the operating system information required by a particular user application process to be checkpointed. Thus, the routine provided by the operating system for performing this task is preferably executed during step 610 in order to save the contents of the registers, the stack pointer and the program counter. For example, the Unix operating system provides a setjmp call which accesses and saves these operating system data structures to one or more declared global data structures, which can then be checkpointed as part of the volatile state. For a detailed discussion of the operation of the setjmp system call, see W. R. Stevens, Advanced Programming in the Unix Environment, pp. 174–180 (Addison Wesley, 1992), incorporated by reference herein.

Thereafter, program control will proceed to step 620. It is noted that during execution of the restoration subroutine 158 (FIGS. 8A and 8B), upon restoration of a desired checkpoint, the value of the program counter will be restored to the value associated with the restored checkpoint. Thus, due to the altered value of the program counter, the restoration subroutine 158 will jump to a position immediately after execution of step 610. It is further noted that the restoration subroutine 158 will provide a return value, preferably greater than 0, that may be utilized to control the flow of execution following the restoration. For example, certain code may be executed for one predefined return value, while a different sequence of code should be executed for another predefined return value.

Thus, a test is performed during step 620 to determine if the return value from the operating system routine, such as the setjmp system call, indicates a value of 0. As indicated above, the restoration subroutine 158 allows a return value greater than 0 to be utilized in a recover mode. Thus, if it is determined during step 620 that the return value is not 0, then current execution of the volatile state checkpoint subroutine 154 has been invoked from the restoration subroutine 158 in a recover mode and program control should proceed directly to step 670 without performing any checkpointing.

If, however, it is determined during step 620 that the return value does equal 0, then current execution of the volatile state checkpoint subroutine 154 has not been invoked from the restoration subroutine 158, and the volatile state checkpoint subroutine 154 should proceed with the volatile checkpoint. Thus, the file descriptors for all of the files open at the time of the volatile checkpoint are preferably stored in an open file table during step 630, together with the associated file name and the current position of the file. Thus, the open file table will include the file descriptor, file name and position of each open file. Thereafter, the data segment associated with the user application process, including all dynamically and statically allocated memory, such as global and static variables, including the open file table, is preferably saved during step 640. Finally, the current contents of the stack are preferably saved during step 650.

Execution of the volatile state checkpoint subroutine 154 will terminate during step 670 and thereafter return with the indicated return value. Thus, if the volatile state checkpoint subroutine 154 returns with a value of zero, this serves as an indication the checkpoint has been successfully taken. In addition, if the volatile state checkpoint subroutine 154 returns with a value greater than zero, this serves as an indication that execution is returning indirectly from the restoration subroutine 158 with a return value that may be utilized to control the flow of execution.

File System Call Interception Subroutine

As previously indicated, the checkpoint and restoration library 150 includes a file system call interception subroutine 156 which implements persistent state checkpoints. The file system call interception subroutine 156 intercepts those file system calls that may modify certain attributes of one or more files, and if necessary, performs a lazy checkpoint of the portions of the persistent state that are about to be modified. Preferably, the file system call interception subroutine 156 performs the persistent state checkpoint before actually executing the requested file operation. In addition, the file system call interception subroutine 156 preferably only performs checkpoints of the persistent state to the extent necessary.

The file system call interception subroutine 156 will be entered at step 700 upon receipt of each intercepted file system call. A test is performed during step 710 to determine if the intercepted file operation modifies a file attribute that should initiate the taking of a checkpoint. If it is determined during step 710 that the intercepted file operation does not modify a file attribute that should initiate the taking of a checkpoint, then program control should proceed to step 750 to perform the desired file operation in the manner described below.

If, however, it is determined during step 710 that the intercepted file operation does modify a file attribute that should initiate the taking of a checkpoint, then a test is performed during step 720 to determine if the user has specified that the current file should be excluded from the checkpoint, for example, by means of executing a unction call, entering a command line argument, or by the setting of an environmental variable. In this manner, a user or user application process can selectively specify on a per-file basis, whether or not given files should be included in the persistent state checkpoint.

If it is determined during step 720 that the current file should be excluded from the checkpoint, then program control should proceed to step 750 to perform the desired file operation in the manner described below. If, however, it is determined during step 720 that the current file should not be excluded from the checkpoint, then a test is performed during step 730 to determine if the file has already been checkpointed since the latest volatile checkpoint, identified by the current value of the global variable, checkpoint id. If it is determined during step 730 that the file has already been checkpointed since the latest volatile checkpoint, then program control should proceed to step 750 to perform the desired file operation in the manner described below.

If, however, it is determined during step 730 that the file has not already been checkpointed since the latest volatile checkpoint, then the file should be checkpointed during step 740 by creating a shadow copy of the file and adding the file name and previous values of modified attributes to the persistent checkpoint table 400 associated with the current value of the checkpoint id. In an alternate embodiment, the persistent state checkpoint can be further optimized by checkpointing each file on a per-attribute basis, and only checkpointing those attributes which are affected by the current file system call. In other words, if a file operation affects only a subset of all attributes, then only the affected subset of attributes need to be checkpointed before the file operation is performed during step 750. For example, if a write system call only appends data at the end of an existing file, it suffices to checkpoint the file size without checkpointing any file content, since the file content of the file as it existed at the volatile checkpoint is not altered. Upon restoration, the file can then be truncated to the appropriate size.

After the file has been checkpointed during step 740, if necessary, the desired file operation may be performed during step 750. Since the persistent state checkpoint is recorded before the file operation is performed, the information stored in the persistent checkpoint table 400 can be used to undo any modifications made to each user file since the latest volatile checkpoint. Once the desired file operation has been performed during step 750, execution of the file system call interception subroutine 156 will terminate during step 760 and return to execution of the user application process.

Restoration Subroutine

As indicated above, the checkpoint and restoration library 150 includes a restoration subroutine 158, shown in FIGS. 8A and 8B, which is invoked when an application process is restarted with a valid checkpoint, for example, by the watchdog 80 following a detected failure, or when a rollback (i) function call has been inserted in the source code associated with the user application process. As used herein, the term rollback indicates a restoration initiated by a user or user application process, and the term recovery indicates a restoration following a failure with a valid checkpoint file. In one embodiment, the restoration subroutine 158 is passed the following arguments: a mode value indicating whether current execution is a recovery mode or a rollback mode, a checkpoint id value, a return value to be retained and returned following execution of the restoration subroutine 158 and a list of protected variables which should maintain their pre-restoration values, even after the process has been restored to a checkpoint. It is noted that if a checkpoint id value is not specified, the process is preferably restored to the latest checkpoint. In addition, if a return value is not specified, a positive return value, such as one, is preferably utilized. The restoration subroutine 158 serves to restore the volatile and persistent states associated with the indicated checkpoint. As discussed below, the restoration subroutine 158 ensures consistency between the volatile and persistent states by restoring the volatile checkpoint and by undoing modifications made to the persistent state since the restored volatile checkpoint.

According to a feature of the present invention, when the restoration subroutine 158 is called by a user or a user application process, a return value and protected variables array may be specified. In one embodiment, the current value of the variables indicated by the protected variables array, as well as the current value of the return value variable, are protected when the restoration subroutine 158 rolls back to the indicated checkpoint. Thus, following a restoration to a particular checkpoint, the return value specified prior to the restoration is maintained, and may be utilized to control the flow of execution after restoration. In addition, if a user or user application process does not wish to roll back all variables to a particular checkpoint, the protected variables mechanism can be utilized to specify the variables which should maintain their current values following the restoration. If a return value is not specified, a default value of 1 is preferably utilized.

As shown in FIG. 8A, once invoked, the restoration subroutine 158 will be entered at step 800. Thereafter, the persistent checkpoint table 400 (FIG. 4) associated with the indicated value of the checkpoint id argument, will be read during step 810. A test is performed during step 815 to determine if the user has indicated that the persistent checkpoint table 400 should be modified, for example, by command line entries or by the setting of environmental variables indicating that one or more shadow files listed in the persistent checkpoint table 400 should not be restored. If it is determined during step 815 that the user has indicated that the persistent checkpoint table 400 should be modified, then the table 400 is modified during step 820 in accordance with the indicated modifications.

Once the persistent checkpoint table 400 has been modified, if necessary, the persistent state is restored during step 825 in accordance with the persistent checkpoint table 400 by searching the appropriate checkpoint data for the shadow file corresponding to each file listed in the table 400 and copying the shadow file onto the current file. In addition, the attributes associated with each file listed in the persistent checkpoint table 400 are modified in accordance with the values recorded in the respective entries in the table 400.

Thereafter, a test is performed during step 830 to determine if the current execution mode of the restoration subroutine 158 is a recovery mode, following a failure, or a user-initiated roll back mode, and if the values in the protected variables array are valid. If it is determined during step 830 that the current execution mode of the restoration subroutine 158 is a roll back mode, and that the values in the protected variables array are valid, then the variables specified by the protected variables array are copied during step 835 from the data segment to a temporary file, in order to protect these variables while the checkpointed data segment is restored.

Thereafter, the volatile checkpoint file identified by the checkpoint id argument is read during step 840. Using the volatile checkpoint file retrieved during the previous step, the data segment, including the open file table, is then restored during step 845.

Thereafter, a test is again performed during step 850 to determine if the current execution mode of the restoration subroutine 158 is a roll back mode, and if the values in the protected variables array are valid. If it is determined during step 850 that the current execution mode of the restoration subroutine 158 is a roll back mode, and that the values in the protected variables array are valid, then the variables specified by the protected variables array are then copied during step 855 back from the protected position in the temporary file back to the data segment. In this manner, each of the variables identified in the protected variables array will maintain their pre-restoration values.

A test is performed during step 865 to determine whether the user has indicated, for example, by a command line entry or by the setting of one or more environmental variables, that the open file table should be modified. If it is determined during step 865 that the user has indicated that the open file table should be modified, then the indicated modification is implemented during step 870. For example, in one application incorporating features of the present invention, described below in a section entitled Bypassing Long Initialization, the restored open file table will list a first set of input files that have been previously processed. For each subsequent set of inputs to be processed, the open file table should be modified to replace the first set of input files with the set of input files appropriate for the current execution.

Once the open file table has been modified, if necessary, the file descriptors indicated in the open file table are restored during step 875. In other words, for each entry in the open file table, the file is opened, the filename is associated with the indicated file descriptor, and the current position of the file is adjusted to the position recorded in the open file table entry. Thereafter, the stack space is preferably allocated during step 880 and the stack is restored during step 885, in accordance with the information in the volatile checkpoint file read during step 840.

As previously indicated, some of the volatile information related to the execution of a user application process, such as the hardware registers for the temporary storage of values in the central processing unit, the stack pointer and the program counter, are maintained by the operating system kernel. Although these memory elements are not normally accessible by user application processes, the operating system will typically provide one or more routines which allows the operating system information required by a particular user application process to be restored. Thus, the routine provided by the operating system for performing this task is preferably executed during step 890 in order to restore the contents of the registers, the stack pointer and the program counter. For example, the Unix operating system provides a longjmp call which restores these operating system data structures. For a detailed discussion of the operation of the longjmp system call, see W. R. Stevens, incorporated by reference above.

Figure 6:
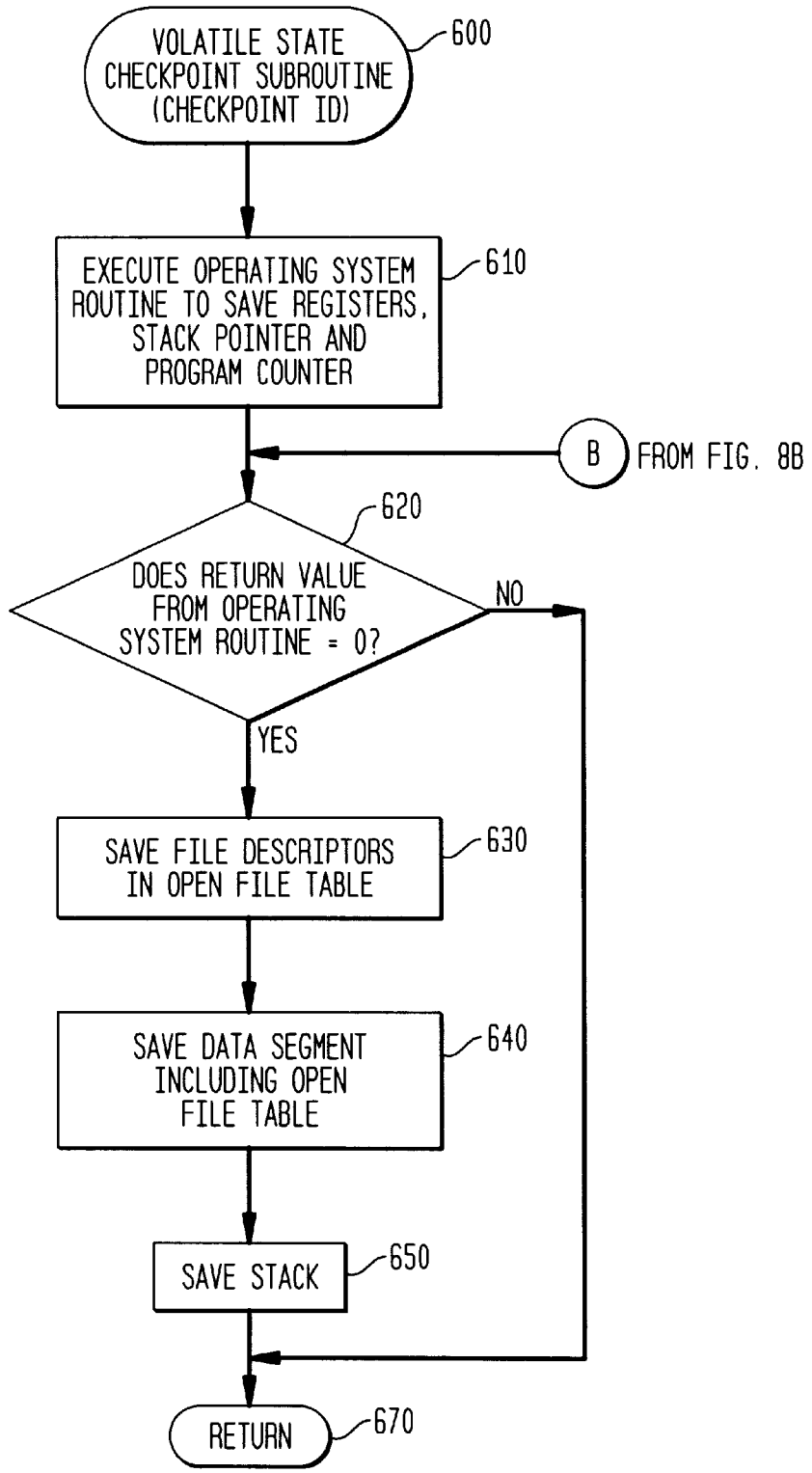
FIG. 6 is a flowchart describing an exemplary volatile state checkpoint subroutine which is invoked to checkpoint the volatile state.
Figure 7:
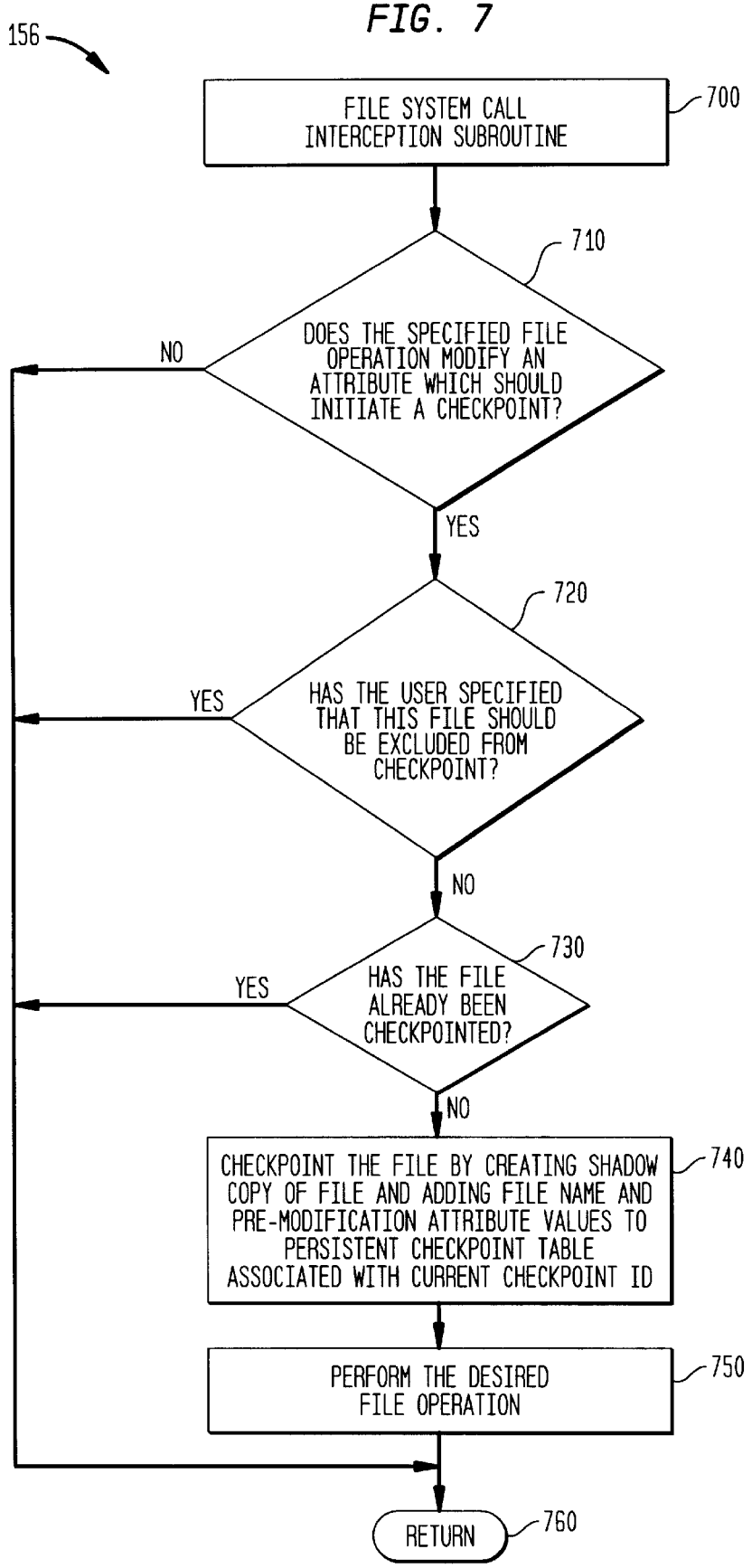
FIG. 7 is a flowchart describing an exemplary implementation of the file system call interception subroutine of FIG. 3, which is invoked to checkpoint a user file before a modification will create an inconsistency between the volatile and persistent states.

As previously indicated, once the value of the program counter is restored to the value recorded during the restored checkpoint, execution of the restoration subroutine will jump to step 620 in the volatile state checkpoint subroutine 154 (FIG. 6). Thus, the restoration subroutine 158 will effectively return from the volatile state checkpoint subroutine 154. In addition, the restoration subroutine 158 will return with the indicated return value and with the variables indicated in the protected variables array maintaining their pre-restoration values.

Clean-Up Subroutine

Figures 9, 10:
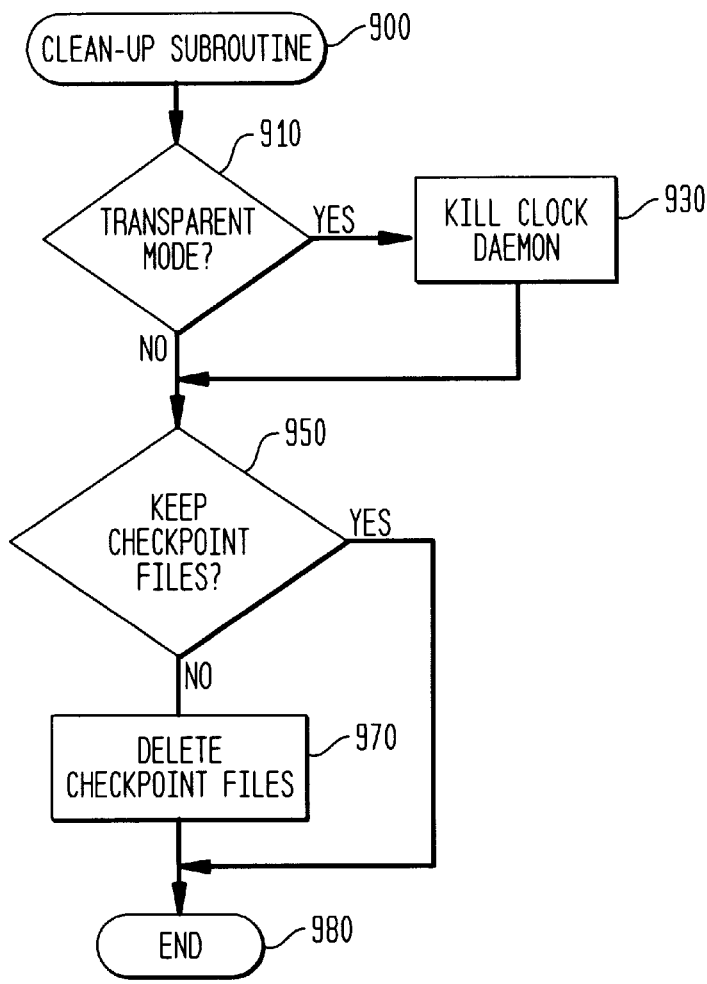
FIG. 9 is a flowchart describing an exemplary clean-up subroutine which may be invoked following execution of the user application process.
FIG. 10 illustrates a sample source code file which incorporates features of the present invention to bypass premature software exits caused by an out-of-resource condition.

As indicated above, the checkpoint and restoration library 150 preferably includes a clean-up subroutine 160 which is preferably executed following execution of the user application process. As shown in FIG. 9, the clean-up subroutine 160 is preferably entered at step 900 when the user application process terminates. A test is performed during step 910 to determine if the current execution mode of the user application process is the transparent mode. If it is determined during step 910 that the current execution mode is the transparent mode, then the clock daemon process created by the pre-execution checkpoint subroutine 152 is killed during step 930.

Thereafter, a test is performed during step 950 to determine if one or more of the checkpoint files associated with the user application process should be maintained. If it is determined during step 950 that the checkpoint files should not be kept, then the checkpoint files associated with the user application process are preferably deleted during step 970. The clean-up subroutine 160 will then terminate execution during step 980.

CHECKPOINT AND RESTORATION APPLICATIONS

Bypassing Premature Software Exits

A user application process may terminate or exit prematurely because the process is unable to allocate some resource that is required for continued execution. Unlike a software failure, when a process exits prematurely due to an out-of-resource condition, or another exception condition, the process is still under control at the point just before the program exits. As used herein, the term exception condition is defined to be any execution outside the normal execution flow, as defined by the user application process. Typically, when a process is unable to allocate a desired resource, such as dynamic memory, the process will print an error message indicating the "unable to allocate resource" condition, and the program is exited prematurely. Such premature software exits are, of course, undesirable, because a lot of useful processing can be wasted, especially for long-running applications. Generally, the process must be restarted from the beginning or perhaps from the latest checkpoint which may have been taken at a specified interval in a transparent checkpoint mode.

The checkpoint and restoration system 10 disclosed herein, however, allows a checkpoint function call to be inserted into the source code, just prior to the point where the process will be exited. In this manner, the process state can later be restored to the point just prior to the position associated with the premature exit. In addition, by utilizing the execution control features of the present invention, following a restoration of the user application process to the latest checkpoint, the return value from the restoration subroutine 158 provides an indication that the current execution is in a recovery mode which may initiate special recovery processing, if desired.

FIG. 10 illustrates a segment of source code incorporating features of the present invention which may be utilized to bypass a premature software exit, caused, for example, by the failure to allocate dynamic memory. The sequence of code indicated in lines 1015 through 1050 are executed for as long as the process is unable to allocate dynamic memory in line 1010. The malloc function call which is executed in line 1010 is a memory allocation function, commonly found in function libraries of the C programming language, which allocates a requested size block of memory and returns the value of the starting address of the allocated memory to the declared pointer, ptr.

When the process is unable to allocate the desired dynamic memory, for example, where another process may have exhausted the remaining swap space, the process will attempt to retry the allocation until the maximum number of retries, specified by the variable, max_retry_count, is exceeded. It is noted that the defined maximum number of retries can be set to zero. Once the max_retry_count has been exceeded, a checkpoint is performed during step 1025, before the process exits during step 1035.

As indicated above, when the process is restored, the restoration subroutine 158 (FIGS. 8A and 8B) will be invoked to restore the volatile and persistent states to the latest checkpoint, in other words, the checkpoint that was performed just prior to exiting. It is again noted that when the value of the program counter is restored during execution of the restoration subroutine 158, execution will jump from the restoration subroutine 158 to the volatile state checkpoint subroutine 154. Thus, the restoration subroutine 158 will return from the volatile state checkpoint subroutine 154 with a positive return value, indicating a recovery mode. Thus, in the illustrative example of FIG. 10, the positive return value will cause program control to proceed to line 1040 for execution of recovery code. In this example, the recovery code consists of resetting the retry_count to zero and reattempting to allocate the desired dynamic memory. However, other recovery code could be executed, as would be apparent to a person of ordinary skill.

It is noted that the out-of-resource condition may be transient and thus bypassed when the process is restored due to environmental diversity, where the same process is executed under different conditions. If the out-of-resource condition is permanent, however, for example, where the current machine simply does not have enough of the given resource to satisfy the requirements of the user application process, process migration to an alternate processing node having a higher capacity may be necessary to bypass the premature exit. The techniques of the present invention allow a process to be started on a workstation and then migrated to another machine having a higher capacity of the desired resource only after the out-of-resource condition is encountered.

Bypassing Long Initialization

Many software programs include initialization routines that are often time-consuming. Further, the same programs are often reexecuted for different sets of input data, with each execution requiring the time-consuming initialization routine to be repeated. Very often, however, the same initialized state can be reused by many different executions of the processing routine, with different input data. Thus, the efficiency of the software programs would be greatly improved by saving the initialized state and then restoring it for use by future executions of the associated software program, each with a different set of input data.

Figure 11:
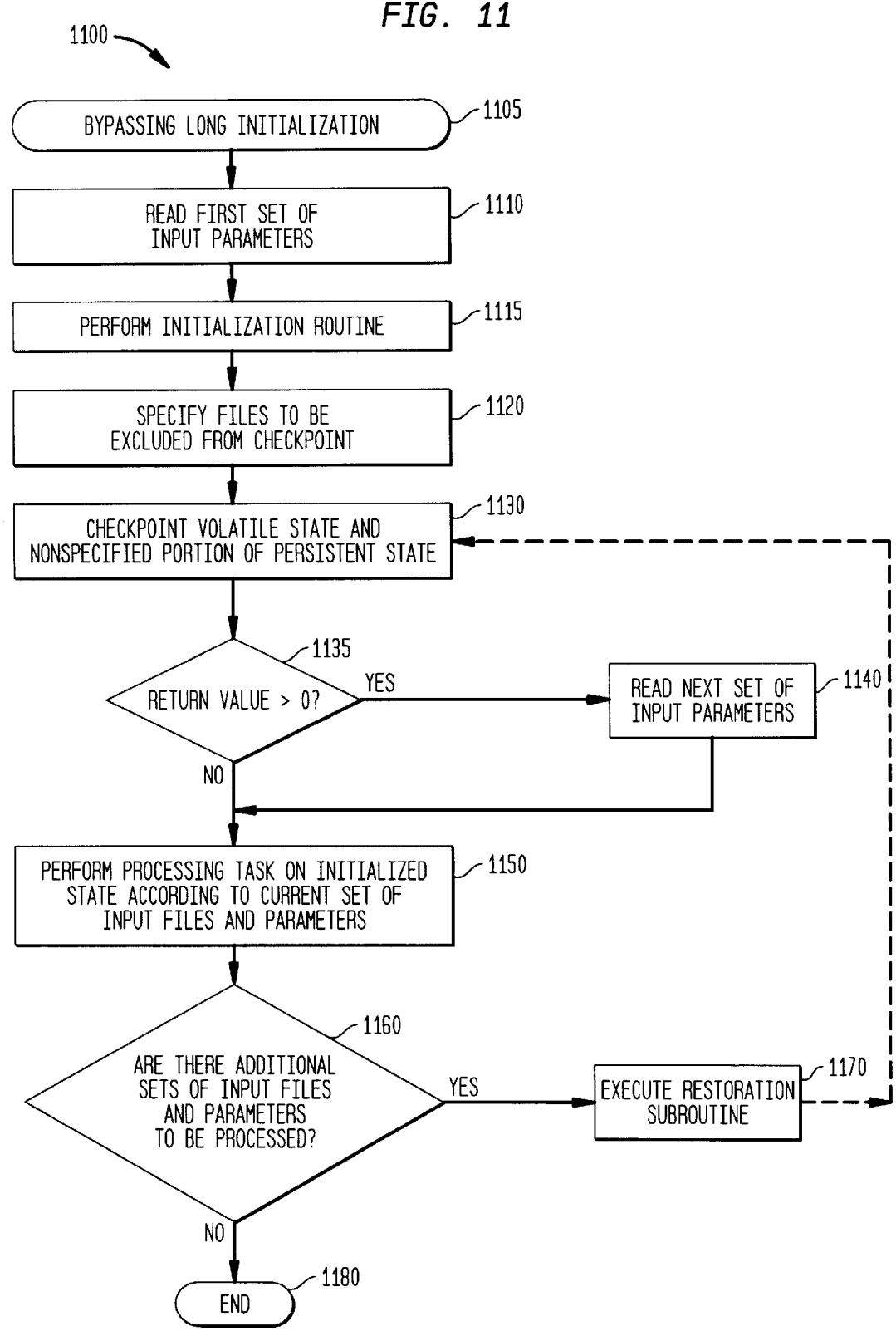
FIG. 11 is a flowchart describing an exemplary bypass long initialization routine which incorporates features of the present invention to checkpoint the initialized state and restore the process state to the initialized state for additional sets of input files and parameters.

According to a feature of the present invention, shown in FIG. 11, the initialization state associated with a given software program can be checkpointed and restored for subsequent executions on different input data. Those input files which are to be replaced for each different execution, however, can be excluded from the checkpoint to allow new input files to be processed for each new execution.

As shown in FIG. 11, a bypassing long initialization routine 1100 is entered at step 1105. The bypassing long initialization routine 1100 will initially read a first set of input parameters, for example, from the command line or a data file, during step 1110, which includes a set of input file names. Thereafter, an initialization routine appropriate for the given user application process is performed during step 1115. The files which should be excluded from the checkpoint, in other words, those files that are to be replaced for each subsequent execution, are preferably specified during step 1120.

Thereafter, the volatile state and the portion of the persistent state which was not specified in the previous step are checkpointed during step 1130. When control returns from the checkpoint function, A test is performed during step 1135 to determine if the return value from the checkpoint function is greater than zero, indicating a recovery mode. If it is determined during step 1135 that the return value is not greater than zero, then this is the first execution of the bypassing long initialization routine 1100 and the first set of data should be processed during step 1150 according to the initialized state and the first set of input files and parameters.

A test is performed during step 1160 to determine if there are additional sets of input files and parameters to be processed. If it is determined during step 1160 that there are additional sets of input files and parameters to be processed, then program control will proceed to step 1170, where the restoration subroutine 158 will be executed with a positive return value. The restoration subroutine 158 will restore the process state to the checkpoint taken during step 1130. It is noted that the open file table which was checkpointed during step 1130 listed each of the input files associated with the first set of inputs. Upon subsequent executions, however, the same set of file descriptors listed in the open file table should be associated with the input files associated with the respective execution. Thus, as indicated above, the restoration subroutine 158 includes a mechanism for allowing the user to alter the open file table to reflect these changes.

It is again noted that when the process state is restored to the latest checkpoint during step 1170, the program counter will also be restored to the value associated with the checkpoint, and thus, program control will jump to the checkpoint function performed during step 1130. When program control returns from the checkpoint function during step 1130 with a positive return value, in the manner described above, the test performed during step 1135 will result in program control proceeding to step 1140. Thus, the next set of input parameters, which includes the list of input file names, will be read during step 1140 for processing during step 1150 in the manner described above, without requiring the initialization routine to be reexecuted.

If, however, it is determined during step 1160 that there are no additional sets of input files and parameters to be processed, execution of the bypassing long initialization routine 1100 will terminate during step 1180.

Memory Rejuvenation

Over time, undesirable memory states can build up and interfere with efficient execution of a software process, as well as gradually degrade system performance and eventually cause software failures. For example, a memory leak can arise where a software program, including many successful commercial products, fails to incorporate proper memory deallocation on certain execution paths. A memory leak will result in memory spaces that have been allocated but are no longer accessible, because they are no longer pointed to by any pointer. A memory leak will typically arise when a pointer that points to a first block of allocated memory is reassigned to point to a second block of allocated memory, without deallocating the first block. Memory leaks result in the cumulative degradation of overall performance and in theory, will cause a process to run out of memory over time.

In addition, the memory caching and weak memory reuse mechanism provided by some available memory managers can lead to an out-of-memory condition, even where the machine has enough physical capacity to satisfy the demand. For example, if a user application process repeatedly asks for small blocks of memory, such as blocks less than 32 bytes, the memory manager will maintain the small blocks, following deallocation, in a separate list, or memory cache, for anticipated future requests for small memory blocks. Thus, the small blocks are unavailable for larger memory requests. If there have been enough requests for small blocks, a larger memory request will be denied, even where there is enough physical capacity. The weak memory reuse mechanism refers to a situation where a machine having, for example, 30 megabytes of memory, first allocates and then deallocates, for example, 15 megabytes of memory. Thereafter, if a user application process requests an allocation of 16 megabytes, an out-of-memory condition may be encountered because rather than adding one megabyte to the deallocated 15 megabytes, the memory manager will reserve the freed 15 megabytes and attempt to allocate 16 megabytes which will appear to exceed the memory limitations of the machine, when in fact, there is enough physical capacity.

Figure 12:
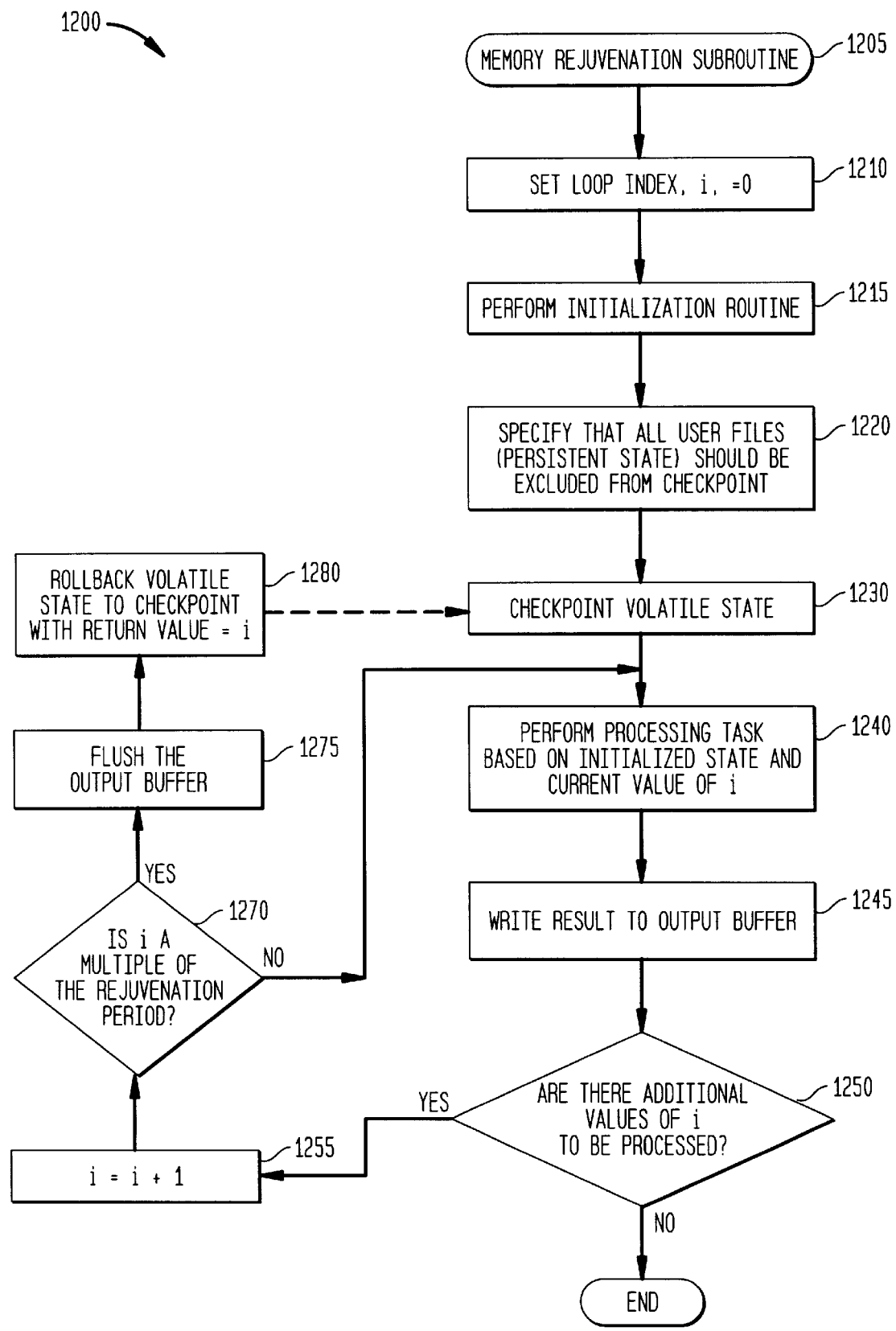
FIG. 12 is a flowchart describing an exemplary memory rejuvenation subroutine which incorporates features of the present invention to checkpoint a clean memory state and restore the process state to the clean memory state.

Thus, according to a further feature of the present invention, a memory rejuvenation subroutine 1200, shown in FIG. 12 checkpoints the memory of a process at a "clean" state as part of the volatile state, and rolls back the process to that clean state from time to time, in order to prevent software failures. The memory rejuvenation subroutine 1200 will initially set a loop index, i, to zero during step 1210. Thereafter, an appropriate initialization routine will be performed during step 1215. It is again noted that the initialized state is part of the checkpointed volatile state.

During step 1220, it is specified that all user files should be excluded from the checkpoint. Thus, when the checkpoint is taken and later restored, only the clean memory state will be restored. Furthermore, by excluding the entire persistent state, in other words, all input files, from the checkpoint, the current contents of the user files will be maintained following the restoration. The volatile state is checkpointed during step 1230 by executing the volatile state checkpoint subroutine 154 (FIG. 6). Thereafter, the desired processing task is performed during step 1240 based on the initialized state and the current value of the loop index, i. The results of the processing task performed in the previous step are written to the output buffer during step 1245, in a known manner. The contents of the output buffer will not be sent to the intended destination, such as the disk, until the buffer is full or a flush system call is executed.

A test is performed during step 1250 to determine if there are additional values of the loop index, i, to be processed. If it is determined during step 1250 that there are additional values of the loop index, i, to be processed, then the loop index will be incremented during step 1255. Thereafter, a test is performed during step 1270 to determine if the current value of the loop index, i, is a multiple of the specified rejuvenation period. In other words, if the clean memory state should be restored upon every 15 executions, then a test is performed to determine whether the current value of the loop index is a multiple of 15. If it is determined during step 1270 that the current value of the loop index, i, is not a multiple of the specified rejuvenation period, then program control will return to step 1240 and continue processing in the manner described above.

If, however, it is determined during step 1270 that the current value of the loop index, i, is a multiple of the specified rejuvenation period, then the output buffer should be flushed during step 1275, before the memory is restored to the clean state. Thereafter, the volatile state is rolled back during step 1280 by executing the restoration subroutine 158 with a return value equal to the current value of the loop index, i. Because the checkpoint does not include any user files, only the clean memory state is restored. As previously indicated, the restoration subroutine 158 will return from the checkpoint function in step 1230 with the return value. Thus, by retaining the return value, which is equal to the loop index, correct progress of the user application process is ensured. When the restoration subroutine 158 returns from the checkpoint function, program control will proceed to step 1240 and continue in the manner described above.

If it is determined during step 1250 that there are no additional values of the loop index, i, to be processed, program control will proceed to step 1290 where execution of the memory rejuvenation subroutine 1200 will terminate.

It is to be understood that the embodiments and variations shown and described herein are illustrative of the principles of this invention only and that various modifications may be implemented by those skilled in the art without departing from the scope and spirit of the invention.

We claim:

1. A method for controlling the execution of a user application process following the restoration of a checkpointed state, said user application process having a process state, said method comprising the steps of:

checkpointing at least a portion of the process state at a first execution point;

restoring the process state to said checkpointed state at a second execution point, said restored process state retaining a pre-restoration value of at least one variable;

resuming execution of the user application process using the restored process state; and performing one or more instructions in said user application process based on the retained pre-restoration value.

2. The method according to claim 1 wherein said retained pre-restoration value indicates a recovery mode.

3. The method according to claim 2 wherein said one or more instructions constitute instructions performed only during said recovery mode.

4. A method for use by a user application process for bypassing an exception condition, said exception condition causing a premature software exit, said method comprising the steps of:

monitoring said application process for said exception condition;

initiating a checkpoint of said user application process upon detection of said exception condition and before prematurely exiting said process, said checkpoint being taken at a checkpoint position;

exiting said process;

restoring said process to said checkpoint position with a return value argument after a delay period, said return value indicating a recovery mode; and examining said return value following said restoration and attempting to bypass said exception condition if said return value indicates a recovery mode.

5. The method according to claim 4 wherein said checkpoint is initiated only after a predefined number of attempts to bypass said exception condition are unsuccessful.

6. The method according to claim 4 wherein said delayed restoration provides environment diversity suitable for bypassing transient exception conditions.

7. The method according to claim 4 wherein said exception condition is an out-of-resource condition.

8. The method according to claim 4 wherein said exception condition is the failure to allocate a desired resource.

9. The method according to claim 4 further comprising the steps of:

retrying said restoring step for a predefined number of times; and migrating said process to another machine if said predefined retry number is exceeded.

10. A method for use by a user application process for bypassing a premature software exit resulting from an out of resource condition, said method comprising the steps of:

monitoring said application process for said out of resource condition;

initiating a checkpoint of said user application process upon detection of said out of resource condition and before prematurely exiting said process, said checkpoint being taken at a checkpoint position;

exiting said process;

restoring said process to said checkpoint position with a return value argument after a delay period, said return value indicating a recovery mode; and examining said return value following said restoration and attempting to allocate said resource if said return value indicates a recovery mode.

11. The method according to claim 10 wherein said checkpoint is initiated only after a predefined number of attempts to allocate said resource are unsuccessful.

12. The method according to claim 10 wherein said delayed restoration provides environment diversity suitable for bypassing transient out of resource conditions.

13. The method according to claim 10 further comprising the steps of:

retrying said restoring step for a predefined number of times; and migrating said process to another machine if said predefined retry number is exceeded.

14. A method for tolerating one or more flaws in a software component imported into a user application process, said user application process having a process state including one or more associated user files, said user application process performing at least two iterations of a processing task, said iteration identified by a counter value, said method comprising the steps of:

initializing said user application process to form an initialized state;

specifying that said user files should be excluded from a checkpoint of said process state;

checkpointing portions of said process state which have not been excluded;

executing said processing task based on said initialized state and said counter value;

incrementing said counter value;

restoring said checkpointed portions of said process state for one or more predefined value of said counter value, said restored process state retaining the current value of said counter value; and repeating said executing step.

15. The method according to claim 14 wherein said flaw introduces an undesirable memory state and said checkpointing step performs a checkpoint of said memory state before said undesirable memory state is introduced.

16. A method for checkpointing and restoring a computer process during continuous execution on a computer system, said computer process having a process state including one or more associated user files, said method comprising the steps of:

excluding said user files from the process state to be checkpointed;

checkpointing portions of the process state which have not been excluded, said checkpoint being performed at a first execution point;

restoring the process state to said checkpointed state at a second execution point, said restored process state retaining at least one pre-restoration value; and resuming execution of the process using the restored process state.

17. The method according to claim 16 wherein said checkpointing step is performed before one or more flaws in said computer process introduces an undesirable memory state in a memory and said restoration step restores said memory to a clean state.

18. The method according to claim 16 further comprising the step of flushing one or more output buffers before said restoration step.

19. A method for checkpointing and restoring a computer process during continuous execution on a computer system, said computer process utilizing one or more variables and having a process state including one or more associated user files, said method comprising the steps of:

excluding said user files from the process state to be checkpointed;

identifying one or more of said variables which should be protected following a restoration;

checkpointing portions of the process state which have not been excluded, said checkpoint being performed at a first execution point;

restoring the process state to said checkpointed state at a second execution point, said restored process state retaining pre-restoration values of said identified protected variables; and resuming execution of the process using the restored process state.

20. A system for checkpointing and restoring a computer process during continuous execution on a computer system, said computer process utilizing one or more variables and having a process state including one or more associated user files, said system comprising:

means for excluding said user files from the process state to be checkpointed;

means for identifying one or more of said variables which should be protected following a restoration;

a memory device for storing a checkpoint of at least a portion of the process state;

means for checkpointing those portions of the process state which have not been excluded, said checkpoint being performed at a first execution point;

processing means for restoring the process state to said checkpointed state at a second execution point, said restored process state retaining pre-restoration values of said identified protected variables; and a processor for resuming execution of the process using the restored process state.

* * * * *